(12) United States Patent
Huang (10) Patent No.: US 12,545,435 B2
(45) Date of Patent: Feb. 10, 2026

(54) AUTOMATIC DETECTION SYSTEM AND AUTOMATIC DETECTION METHOD FOR ENCLOSED SPACE

(71) Applicant: AIRBUS (BEIJING) ENGINEERING CENTRE COMPANY LIMITED, Beijing (CN)

(72) Inventor: Jinming Huang, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 72 days.

(21) Appl. No.: 18/679,273

(22) Filed: May 30, 2024

(65) Prior Publication Data

US 2024/0402727 A1 Dec. 5, 2024

(30) Foreign Application Priority Data

Jun. 5, 2023 (CN) .......................... 202310656217.7

(51) Int. Cl.
*B64F 5/60* (2017.01)
*G05D 1/617* (2024.01)
(Continued)

(52) U.S. Cl.
CPC .............. *B64F 5/60* (2017.01); *G05D 1/617* (2024.01); *G05D 1/646* (2024.01); *G05D 1/648* (2024.01);
(Continued)

(58) Field of Classification Search
None
See application file for complete search history.

(56) References Cited

U.S. PATENT DOCUMENTS

2016/0264262 A1 9/2016 Colin et al.
2020/0377233 A1 12/2020 Harvey et al.
(Continued)

FOREIGN PATENT DOCUMENTS

CN 105973308 A 9/2016
CN 105 873 825 11/2018
(Continued)

OTHER PUBLICATIONS

Satler Massimo et al. "Towards an Autonomous Flying Robot for Inspections in Open and Constrained Spaces", IEEE, retrieved from the Internet, <https://ieeexplore.ieee.org/stamp/stam p.j sp?arnumber=6808865>, six pages, Feb. 11, 2014.
(Continued)

*Primary Examiner* — Peter D Nolan
*Assistant Examiner* — Michael F Whalen
(74) *Attorney, Agent, or Firm* — Nixon & Vanderhye, PC (57) ABSTRACT

The present disclosure relates to an automatic detection system and an automatic detection method for an enclosed space. The automatic detection system includes: an interactive device; a movable platform; an environment perceiving device; a defect detection device; a memory; and a processing device. The processing device is configured to process the environmental data of the environment perceiving device to control the movable platform and the defect detection device, and process the detection data generated by the defect detection device to generate a detection report. The interactive device, the environment perceiving device, the defect detection device, the memory and the processing device are installed on the movable platform, and the interactive device can be operated to identify the enclosed space and enable the automatic detection system to automatically perform detection in an automatic detection mode based on the digital mock-up data of the enclosed space.

20 Claims, 7 Drawing Sheets

(51) Int. Cl.
- *G05D 1/646* (2024.01)
- *G05D 1/648* (2024.01)
- *G05D 1/65* (2024.01)
- *G06V 10/141* (2022.01)
- *G06V 20/56* (2022.01)
- *G05D 105/80* (2024.01)
- *G05D 107/00* (2024.01)
- *G05D 111/10* (2024.01)
- *G05D 111/50* (2024.01)

(52) U.S. Cl.
CPC ............ *G05D 1/65* (2024.01); *G06V 10/141* (2022.01); *G06V 20/56* (2022.01); *G05D 2105/89* (2024.01); *G05D 2107/95* (2024.01); *G05D 2111/10* (2024.01); *G05D 2111/50* (2024.01)

(56) References Cited

U.S. PATENT DOCUMENTS

2022/0147053 A1 5/2022 Lin et al.
2023/0052887 A1 2/2023 Hong et al.

FOREIGN PATENT DOCUMENTS

| | | | | |
|---|---|---|---|---|
| CN | 109900280 A | | 6/2019 | |
| CN | 111813125 A | | 10/2020 | |
| CN | 111882694 A | * | 11/2020 | ............... G07C 1/20 |
| CN | 112330837 A | * | 2/2021 | ............ G06F 40/18 |
| CN | 113112098 A | | 7/2021 | |
| CN | 114648577 A | | 6/2022 | |
| CN | 115128093 A | | 9/2022 | |
| EP | 4 063 279 A1 | | 9/2022 | |

OTHER PUBLICATIONS

Bruton James, "How this Robot Climbs up Stairs", retrieved from the Internet, <https://www.youtube.com/watch?v=MUyFDWbXrZO>, two pages, Jan. 10, 2023.

Zhang Ting et al., "Trajectory Planning Based on Spatio-Temporal Map With Collision Avoidance Guaranteed by Safety Strip", IEEE Transactions on Intelligent Transportation Systems, vol. 23, No. 2, pp. 1030-1043, Feb. 1, 2022.

Extended European Search Report for Application No. EP24179118. 5, 10 pages, dated Oct. 22, 2024.

First Office Action with English Translation for Application No. CN 202310656217.7, 16 pages, dated Aug. 16, 2025.

* cited by examiner

AUTOMATIC DETECTION SYSTEM AND AUTOMATIC DETECTION METHOD FOR ENCLOSED SPACE

CROSS REFERENCE TO RELATED APPLICATION

This application claims the benefit of priority to the following Chinese patent application: Chinese patent application No. 202310656217.7, titled "AUTOMATIC DETECTION SYSTEM AND AUTOMATIC DETECTION METHOD FOR ENCLOSED SPACE", filed with the China National Intellectual Property Administration on Jun. 5, 2023. Above Chinese patent application is incorporated herein by reference in their entirety.

TECHNICAL FIELD

The present disclosure relates to an automatic detection system and an automatic detection method, and more specifically, to an automatic detection system and an automatic detection method for detecting an enclosed space (such as an internal space of an aircraft).

BACKGROUND

The contents of this section only provide background information related to the present disclosure, which may not constitute the prior art.

Detecting the status of an enclosed environment is common in many industrial fields. For example, in the field of aircraft, as part of the maintenance work of the aircraft, the status of the cargo hold of an aircraft is generally detected before flight. For a civil aircraft, the cargo hold, as a part of the entire aircraft, is mainly used to load goods such as passengers' luggage. In the maintenance and inspection of the aircraft, it is necessary to detect if there is any damage (such as dents or cracks) to the facilities of the cargo hold (such as the floor and side plates of the cargo hold), so that the damaged parts can be maintained timely.

Robot based automatic detection technology has been widely used in aircraft maintenance. For example, a detection robot can be used to move around the aircraft to inspect the appearance of components of the aircraft. However, due to the specific spatial characteristics of internal space of the aircraft, such as limited space and insufficient illumination, detection robots commonly used in open spaces are not suitable for use in the internal space of aircraft, and the accuracy of detection results cannot be guaranteed.

Therefore, in the inspection of the internal space of the aircraft (such as the cargo hold), it is generally a staff member who enters the internal space to perform inspection referring to an inspection checklist. With the development of technology, the detection of the internal space of aircraft is expected to gradually shift from manual detection implemented by staff on site to automatic detection based on robots, so as to improve efficiency.

Therefore, there is a need to design a detection robot suitable for enclosed spaces.

SUMMARY

It is an object of the present disclosure to provide an automatic detection system for an enclosed space, which can reduce the workload of the operator and improve the detection efficiency. It is another object of the present disclosure to improve the accuracy of detection results of automatic detection.

According to an aspect of the present disclosure, an automatic detection system for an enclosed space is provided. The automatic detection system includes: an interactive device, configured to provide interaction between an operator and the automatic detection system; a movable platform, configured to move within the enclosed space; an environment perceiving device, configured to obtain environmental data of the movable platform during motion of the movable platform; a defect detection device, configured to detect the enclosed space to generate detection data, where the defect detection device includes a detection photographing device; a memory, which stores digital mock-up data of the enclosed space; and a processing device, which communicates with the movable platform, the interactive device, the environment perceiving device, the defect detection device and the memory, and is configured to process the environmental data of the environment perceiving device to control the movable platform and the defect detection device, and process the detection data generated by the defect detection device to generate a detection report. The interactive device, the environment perceiving device, the defect detection device, the memory and the processing device are installed on the movable platform, and the interactive device is operatable to identify the enclosed space and enable the automatic detection system to automatically perform detection in an automatic detection mode based on the digital mock-up data of the enclosed space.

Therefore, the automatic detection system utilizes the digital mock-up data of the enclosed space (for example, the internal space of the aircraft, such as the cargo hold or passenger compartment) to automatically perform detection and generate detection reports, which can reduce the workload of the operator and improve the detection efficiency.

The processing device includes: a data obtaining and preprocessing part, configured to obtain the digital mock-up data of the enclosed space from the memory, obtain the environmental data from the environment perceiving device and the detection data from the defect detection device, and preprocess the environmental data and the detection data; a control part, configured to communicate with the data obtaining and preprocessing part to determine a target detection path; and a detection analyzing part, configured to communicate with the data obtaining and preprocessing part to analyze the detection result and generate a detection report. The processing device is such configured that in the automatic detection mode: the data obtaining and preprocessing part searches for available learning data in the memory, where the learning data includes the target detection path of the movable platform and detection mark point data; if the data obtaining and preprocessing part finds available learning data, the control part obtains the target detection path from the learning data; if the data obtaining and preprocessing part finds no available learning data, the control part automatically generates a target detection path based on the digital mock-up data of the enclosed space obtained by the data obtaining and preprocessing part; and the control part controls the movable platform to move along the target detection path.

The automatic detection system can automatically perform detection based on the existing learning data in combination with the digital mock-up data of the enclosed space (such as, the internal space of the aircraft), further improving detection efficiency and accuracy.

The interactive device is operatable to enable the automatic detection system to perform detection in a learning detection mode. In the learning detection mode, the operator operates the movable platform and the defect detection device, and inputs the detection mark point data via the interactive device. The processing device is such configured that: in the learning detection mode, the control part communicates with the data obtaining and preprocessing part to automatically identify a motion path of the movable platform and detection mark point data, stores the identified motion path of the movable platform and the identified detection mark point mark into the memory as learning data of the automatic detection mode.

Therefore, the automatic detection system can utilize the empirical operation data of the operator, and combine it with the digital mock-up data of the enclosed space (such as, the internal space of the aircraft), which further improves the accuracy of the detection results.

The detection analyzing part is configured to: update the learning data of the automatic detection mode for the enclosed space based on a detection result of the enclosed space.

Therefore, when performing automatic detection, the automatic detection system can further improve the detection process, avoid omission, and ensure the accuracy of the detection results based on the empirical data of previous detections.

The environment perceiving device includes: a motion camera, configured to capture localization images while moving with the movable platform; an inertial measurement unit and a wheel odometer, where the inertial measurement unit and the wheel odometer are configured to measure the motion of the movable platform. The processing device is such configured that: the data obtaining and preprocessing part preprocesses the localization images captured by the motion camera and the measurement data of the inertial measurement unit and the wheel odometer, for determining a pose of the movable platform by the control part.

The automatic detection system measures the motion of the movable platform in many aspects through the motion camera, the inertial measurement unit and the wheel odometer, and obtains an accurate pose of the movable platform by fusing the data of these sensors, so as to achieve accurate localization and navigation.

The data obtaining and preprocessing part is configured to perform texture optimization for the localization images. Therefore, the quality of the localization images can be improved, thereby improving the robustness of automatic detection.

The environment perceiving device further includes a light intensity sensor, and the automatic detection system further includes an illumination device, where the illumination device is installed on the motion camera or the defect detection device. The processing device is configured to selectively activate the illumination device based on a detection result of the light intensity sensor.

Therefore, the automatic detection system can overcome the problem of insufficient illumination in the enclosed space, ensure the quality of the captured images, and thus ensure the precision of navigation and localization and ensure the accuracy of detection analysis.

The environment perceiving device further includes: an impact sensor, configured to detect collision of the automatic detection system; and an obstacle detection sensor, configured to detect obstacles in the motion path of the movable platform, where the obstacle detection sensor includes at least one of ultrasonic sensor, lidar and time of flight sensor.

The processing device is such configured that: the data obtaining and preprocessing part obtains and preprocesses measurement data from the impact sensor and the obstacle detection sensor, for controlling the motion of the movable platform by the control part.

Therefore, the automatic detection system can detect obstacles, detect collisions or avoid collisions, and correspondingly control the motion of the movable platform.

The automatic detection system further includes an outer cover. The outer cover is installed to the movable platform to accommodate the devices carried by the movable platform at least partly inside the outer cover. The outer cover is provided with an anti-collision strip.

Thus, the automatic detection system has a good appearance and also provides protection for the devices carried by the movable platform.

The movable platform is provided with two driving wheels and multiple follower wheels, where the multiple follower wheels are configured to be independently controlled. The automatic detection system can receive good support and move stably. Moreover, the flexibility of motion of the automatic detection system is also improved.

The enclosed space is the cargo hold or passenger compartment of the aircraft.

According to another aspect of the present disclosure, an automatic detection method for an enclosed space is provided. The automatic detection method is executed by an automatic detection system, where the automatic detection system includes an interactive device, a movable platform, an environment perceiving device, a defect detection device, a memory and a processing device. The interactive device, the environment perceiving device, the defect detection device, the memory and the processing device are installed on the movable platform. The processing device communicates with the interactive device, the movable platform, the environment perceiving device, the defect detection device and the memory. The automatic detection method includes the following steps: operating the interactive device to identify and confirm the enclosed space; and operating the interactive device to enable the automatic detection system to automatically perform detection in an automatic detection mode based on digital mock-up data of the enclosed space; and automatically generating a detection report.

When detection is performed in the automatic detection mode, the automatic detection method includes: searching for the digital mock-up data of the enclosed space in the memory; searching for available learning data in the memory, where the learning data includes a target detection path of the movable platform and detection mark point data; if available learning data is found, obtaining the target detection path from the learning data, and if no available learning data is found, automatically generating the target detection path on the basis of the digital mock-up data of the enclosed space; and controlling the movable platform to move along the target detection path, and controlling the defect detection device to detect the enclosed space to generate detection data.

The automatic detection method further includes: operating the interactive device to enable the automatic detection system to perform detection in a learning detection mode; and when detection is performed in the learning detection mode, the automatic detection method includes: operating, by an operator, the automatic detection system to control the motion of the movable platform and control the defect detection device to generate detection data, and inputting detection mark point data via the interactive device; obtaining, by the processing device, environmental data from the environment perceiving device, automatically identifying the motion path of the movable platform and the detection mark point data, and storing the identified motion path of the movable platform and the identified detection mark point data into the memory as learning data of the automatic detection mode.

The environment perceiving device includes a motion camera, an inertial measurement unit and a wheel odometer. The automatic detection method includes: processing localization images captured by the motion camera and measurement data of the inertial measurement unit and the wheel odometer to calculate a real-time pose of the movable platform.

The environment perceiving device includes an obstacle detection sensor and an impact sensor, where the obstacle detection sensor includes at least one of ultrasonic sensor, lidar and time of flight sensor. When detection is performed in the automatic detection mode, the automatic detection method further includes: controlling the motion of the movable platform based on measurement results of the obstacle detection sensor and the impact sensor.

The environment perceiving device further includes a light intensity sensor, and the automatic detection system further includes an illumination device, where the illumination device is installed on the motion camera or the defect detection device. When detection is performed in the automatic detection mode, the automatic detection method further includes: automatically activating the illumination device when insufficient light is detected by the light intensity sensor.

The defect detection device includes a detection photographing device. When detection is performed in the automatic detection mode, the automatic detection method includes: controlling a speed of the movable platform and a pose of the detection photographing device on the basis of the learning data when reaching the detection mark point.

The automatic detection method further includes: updating the learning data of the automatic detection mode for the enclosed space based on a detection result of the enclosed space.

The movable platform is provided with two driving wheels and multiple follower wheels. When detection is performed in the automatic detection mode, the automatic detection method further includes raising some of the multiple follower wheels.

The present disclosure provides an automatic detection system and an automatic detection method for an enclosed space. The automatic detection system and the automatic detection method for an enclosed space according to the present disclosure can utilize the digital mock-up data of the enclosed space to automatically perform detection and generate detection reports, thereby significantly reducing the workload of the operator and improving the detection efficiency. Moreover, the automatic detection system and the automatic detection method for an enclosed space according to the present disclosure can utilize the empirical operation data of the operator, ensuring the accuracy of detection results.

BRIEF DESCRIPTION OF THE DRAWINGS

Embodiments of the present disclosure will be described below in an exemplary manner with reference to the accompanying drawings. In the accompanying drawings, the same features or components are represented by the same reference numerals. The accompanying drawings may not necessarily be drawn to scale, and in the accompanying drawings.

DETAILED DESCRIPTION OF THE EMBODIMENTS

The following description is essentially illustrative, rather than being intended to limit the present disclosure and the application or usage thereof. It should be appreciated that, throughout all these accompanying drawings, similar reference numerals indicate the same or similar parts or features. Each drawing only illustratively shows the concept and principle of the embodiments of the present disclosure, and does not necessarily show the specific dimensions and scales of various embodiments of the present disclosure. Specific parts in specific drawings may be exaggerated to illustrate related details or structures of various embodiments of the present disclosure.

Figure 1:
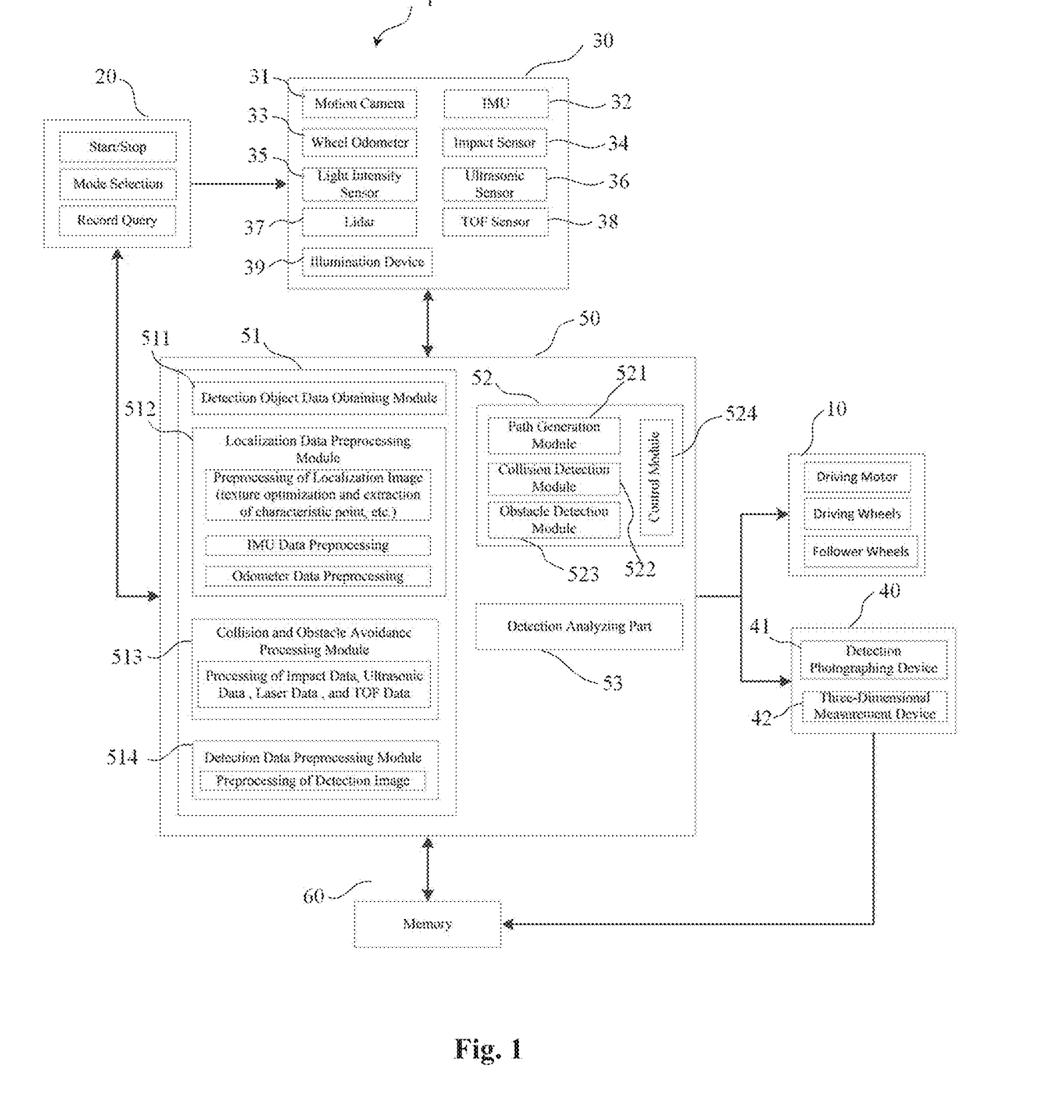
FIG. 1 shows a block diagram of an automatic detection system according to an embodiment of the present disclosure.

FIG. 1 shows a block diagram of an automatic detection system 1 according to an embodiment of the present disclosure. As shown in FIG. 1, the automatic detection system 1 includes a movable platform 10, an interactive device 20, an environment perceiving device 30, a defect detection device 40, a processing device 50, and a memory 60. The interactive device 20, the environment perceiving device 30, the defect detection device 40, the processing device 50, and the memory 60 can all be installed on the movable platform 10.

The movable platform 10 can be provided with a drive motor and multiple traveling wheels, and can move stably. The traveling wheels of the movable platform 10 can include driving wheels that drive the movable platform 10 to move and follower wheels that move accordingly following the motion of the driving wheels.

The interactive device 20 provides an interface between the automatic detection system 1 and an operator. After the automatic detection system 1 is turned on, the operator can start or stop the operation of the automatic detection system 1, select a detection mode, and query detection records via the interactive device 20.

The environment perceiving device 30 is configured to perceive the environment where the movable platform 10 is located during the motion of the movable platform 10, obtain environmental data of the movable platform 10, and determine the poses of the movable platform 10 and the devices carried thereon in real-time for localization and navigation. The environment perceiving device 30 includes various sensors or detectors for perceiving the environment, such as, but not limited to, a motion camera 31, an inertial measurement unit (IMU) 32, a wheel odometer 33, an impact sensor 34, a light intensity sensor 35, an ultrasonic sensor 36, a lidar 37, and a time of flight (TOF) sensor 38. The environment perceiving device 30 may also include other sensors or detectors. The motion camera 31 can be installed on the movable platform 10, so that the pose of the motion camera 31 relative to the movable platform 10 is adjustable. In one example, the motion camera 31 can be installed on the movable platform 10 via a motion controllable pan-tilt platform, so that a photographing pose of the motion camera 31 can be changed by the motion of the pan-tilt platform. The motion camera 31 is configured to capture environmental images as localization images when moving with the movable platform 10. Preferably, the motion camera 31 is a high-speed binocular camera. The environment perceiving device 30 further includes an illumination device 39 which can be installed on the motion camera 31. In the case of insufficient light, for example, when insufficient light is detected by the light intensity sensor 35, the illumination device 39 can be automatically activated to illuminate the located area, to improve the quality of the localization images captured by the motion camera 31 and thereby improve localization accuracy.

IMU 32 and the wheel odometer 33 are configured to measure the motion, distance, orientation and so on of the movable platform 10 during the motion of the movable platform 10. The measurement data of the IMU 32 and the wheel odometer 33, as well as the localization images captured by the motion camera 31, are processed to determine the poses of the movable platform 10 and the devices carried thereon.

The impact sensor 34 is used to detect collisions that occur during the motion of the movable platform 10. The ultrasonic sensor 36, the lidar 37, and the TOF sensor 38 constitute an obstacle detection sensor of the environment perceiving device 30 for detecting obstacles that may be encountered by the movable platform 10 during motion and thus for avoiding obstacles during the navigation process of the movable platform 10. The lidar 37 can be a 2D or 3D lidar. It should be noted that the obstacle detection sensor of the environment perceiving device 30 may include at least one of the ultrasonic sensor 36, the lidar 37, and the TOF sensor 38, or further include other sensors other than the ultrasonic sensor 36, the lidar 37, and the TOF sensor 38.

The defect detection device 40 is configured to detect and measure defects in a detection object (such as an enclosed space inside an aircraft, such as a cargo hold or passenger compartment). The defect detection device 40 includes a detection photographing device 41 and a three-dimensional measurement device 42. The detection photographing device 41 is configured to capture detection images of the detection object at predetermined time intervals when moving with the movable platform 10 within the area of the detection object (such as an enclosed space inside an aircraft, such as a cargo hold), and store the captured detection images in the memory 60. The defect detection device 40 is installed on the movable platform 10, so that the pose of the detection photographing device 41 relative to the movable platform 10 is adjustable. The three-dimensional measurement device 42 is used to measure the three-dimensional dimensions of the defects.

The memory 60 is used to store an identification number of the object to be detected and its corresponding digital mock-up (DMU) data, learning data, detection rules, detection records, and so on.

The processing device 50 is configured to communicate with the movable platform 10, the interactive device 20, the environment perceiving device 30, the defect detection device 40, and the memory 60. The processing device 50 includes a data obtaining and preprocessing part 51, a control part 52, and a detection analyzing part 53. The data obtaining and preprocessing part 51 includes a detection object data obtaining module 511, a localization data preprocessing module 512, a collision and obstacle avoidance preprocessing module 513, and a detection data preprocessing module 514. The detection object obtaining module 511 obtains user input from the interactive device 20, and obtains data of the detection object (such as the DMU data, the learning data, the detection rules, the detection records and so on of the detection object) from the memory 60 based on the user input (such as the identification number of the detection object).

The localization data preprocessing module 512 can obtain and preprocess the data of the localization images captured by the motion camera 31 and the measurement data of the IMU 32 and the wheel odometer 33 from the environment perceiving device 30, and in combination with the data of the detection object obtained by the detection object data obtaining module 511, calculate the real-time poses, relative to the detection object, of the movable platform 10 and the devices carried thereon. The preprocessing of localization image includes image processing such as extraction of characteristic points of the localization images obtained from the motion camera 31, and preferably, also includes performing texture optimization for the localization images before extracting characteristic points from the localization images. Therefore, the quality of the localization images is improved, thereby improving the robustness of calculation of navigation and localization. The texture optimization for the localization images includes image processing on the localization images obtained from the motion camera 31 to extract texture information of the images. When it is determined that the texture in the localization image is sparse, for example, when the surface of the part captured by the motion camera 31 is smooth or the texture of the localization image is sparse due to reflection, the localization image is supplemented with texture, so as to improve the quality of the localization image and thereby improve the robustness of navigation and localization and the robustness of automatic detection based on the navigation and localization.

The collision and obstacle avoidance preprocessing module 513 can obtain measurement data of the impact sensor 34, the ultrasonic sensor 36, the lidar 37, and the TOF sensor 38 from the environment perceiving device 30 and preprocess the measurement data for collision detection, obstacle detection and further for processing of collision prevention and obstacle avoidance.

The detection data preprocessing module 514 obtains detection data (including detection images captured by the detection photographing device 41 and three-dimensional data measured by the three-dimensional measurement device 42) from the defect detection device 40 and preprocesses the detection data, associates the detection data with the corresponding real-time pose, forms detection position metadata, and stores the detection position metadata in the memory 60.

The control part 52 executes control, including control on the movable platform 10 and the defect detection device 40, based on various data obtained by the data obtaining and preprocessing part 51 and the preprocessing results of various data. The control part 52 includes a path generation module 521, a collision detection module 522, an obstacle detection module 523, and a control module 524. The control module 524 executes corresponding controls based on the processing results of the path generation module 521, the collision detection module 522, and the obstacle detection module 523. The path generation module 521 generates the motion path of the automatic detection system 1 in real-time based on the real-time poses determined by preprocessing the localization data by the localization data preprocessing module 512 and the data of the detection object obtained by the detection object obtaining module 511. The control module 524 controls the motion of the movable platform 10, the pose of the motion camera 31, and the pose of the detection photographing device 41 based on the generated motion path. The collision detection module 522 detects collisions based on the preprocessing of the data of the impact sensor 34 by the collision and obstacle avoidance preprocessing module 513. The obstacle detection module 523 detects obstacles based on the processing of the data of the obstacle detection sensor (that is, the ultrasonic sensor 36, the lidar 37, and the TOF sensor 38) by the collision and obstacle avoidance preprocessing module 513. Once a collision is detected or an obstacle is detected in front, the path generation module 521 regenerates the motion path, and the control module 524 controls the movable platform 10 based on the generated new motion path to quickly eliminate the current collision or bypass the obstacle to avoid collision.

The detection analyzing part 53 determines the detection result according to the preprocessing by the detection data preprocessing module 514 on the detection images captured by the detection photographing device 41, based on the real-time poses determined by the localization data preprocessing module 512, the DMU data and a corresponding detection specification of the detection object obtained from the memory 60 by the detection object obtaining module 511, and then stores the detection result in the memory 60. The detection result includes whether there are defects (such as dents or cracks), and the location, size (length, width, depth), and three-dimensional contour of the defects. When a defect is detected, the detection analyzing part 53 can activate the three-dimensional measurement device 42 to measure the defect area to obtain three-dimensional dimensional information of the defect. It should be noted that in this example, the detection analyzing part 53 is provided as a part of the processing device 50, and the three-dimensional measurement device 42 is provided as a part of the defect detection device 40. However, the present disclosure is not limited thereto. In other examples according to the present disclosure, the detection analyzing part 53 and the three-dimensional measurement device 42 may be an integrated device.

Figure 2:
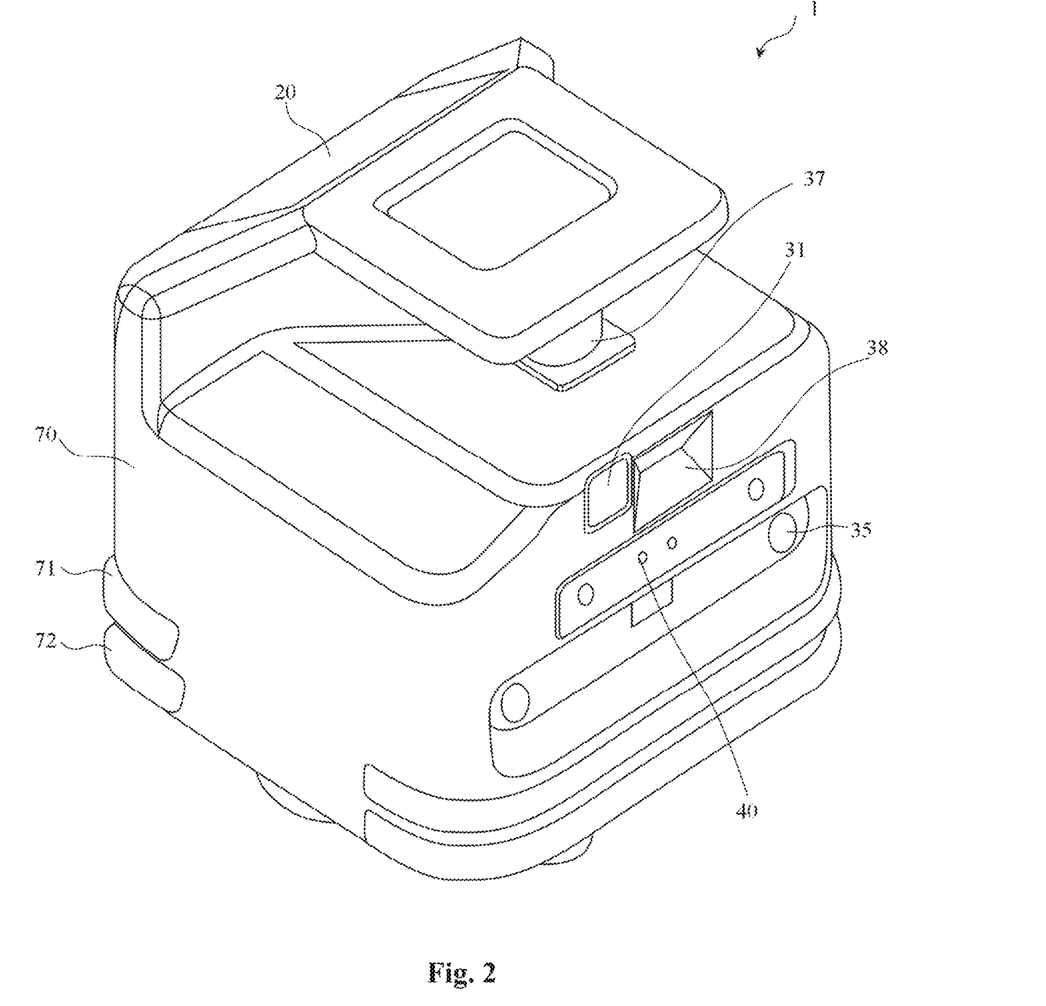
FIG. 2 shows a stereoscopic view of the automatic detection system according to an example of the present disclosure.
Figure 3:
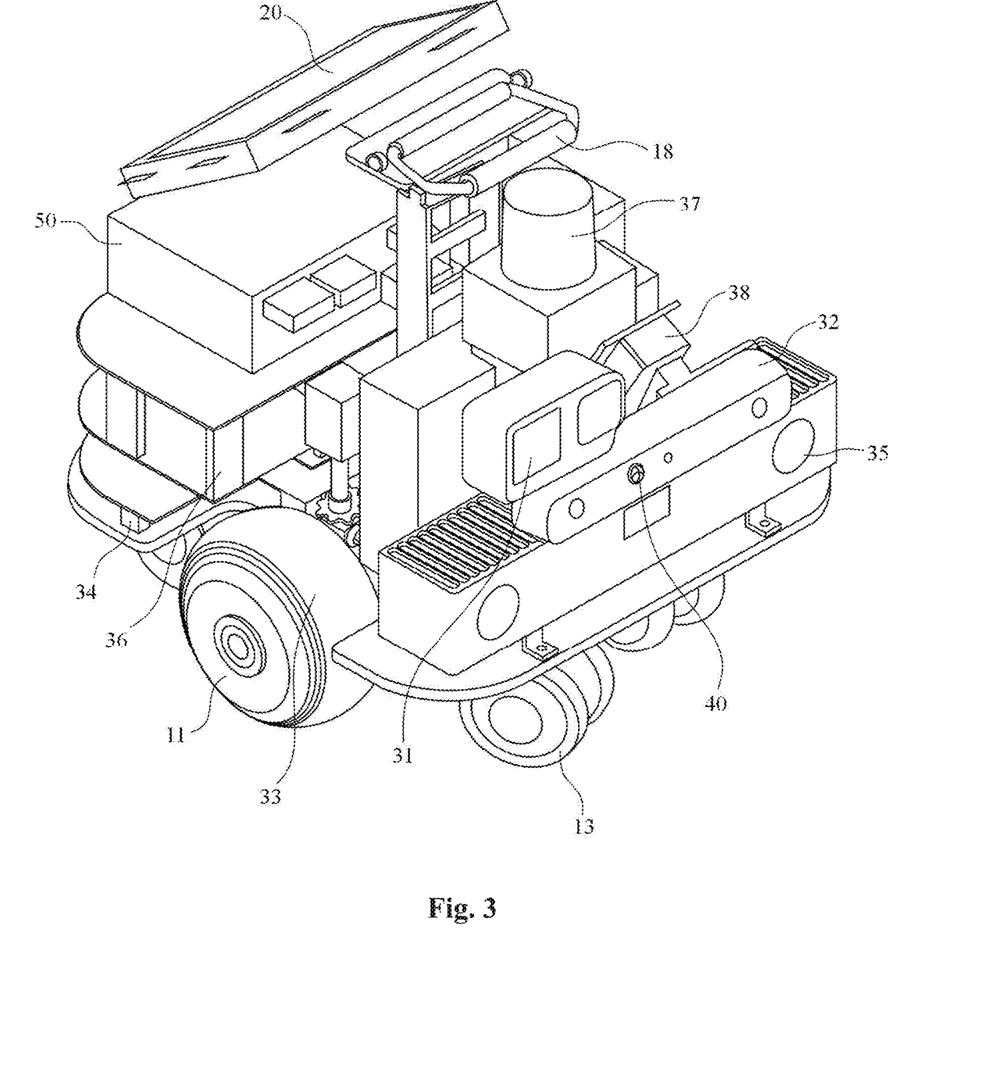
FIG. 3 shows a stereoscopic view of the automatic detection system in FIG. 2 after an outer cover of the automatic detection system is removed.
Figure 4:
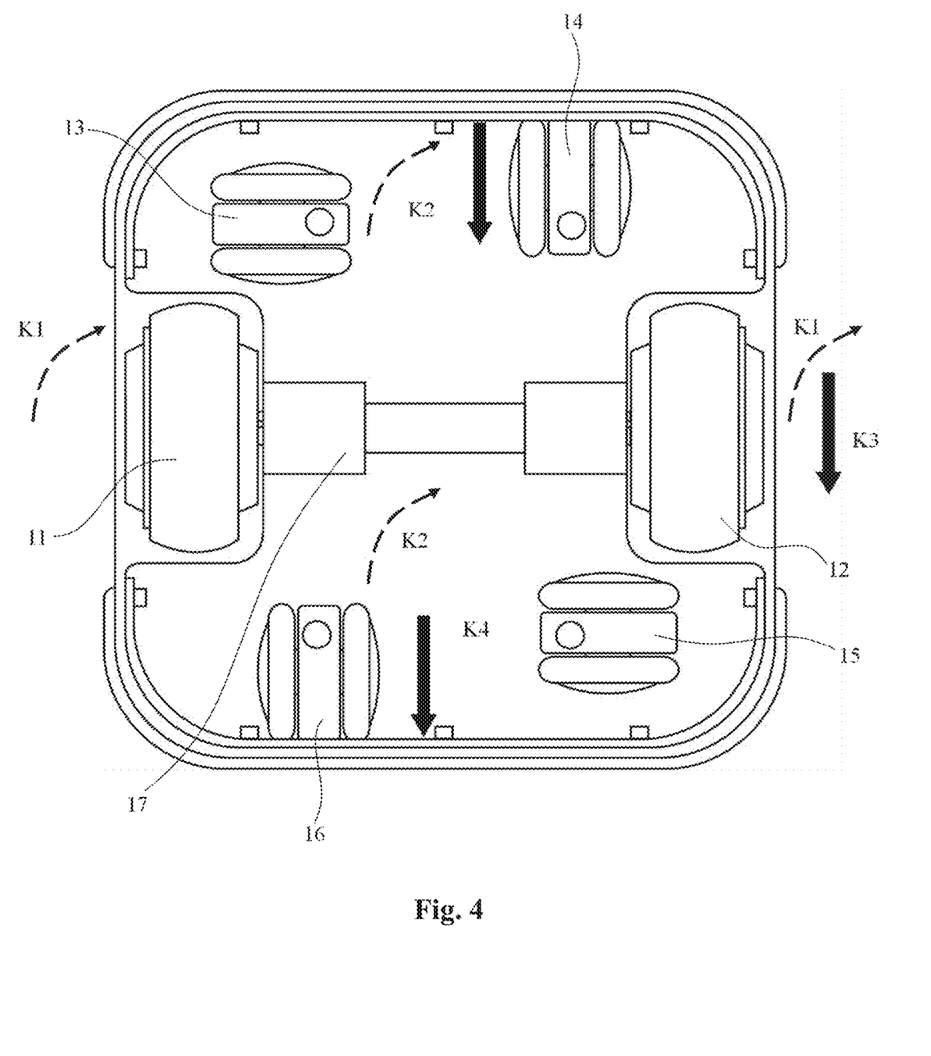
FIG. 4 shows a bottom view of the automatic detection system, showing the status of each traveling wheel of the automatic detection system.

FIG. 2 shows a stereoscopic view of the automatic detection system 1 according to an example of the present disclosure, FIG. 3 shows a stereoscopic view of the automatic detection system 1 in FIG. 2 after an outer cover 70 of the automatic detection system is removed, and FIG. 4 shows a bottom view of the automatic detection system 1. The interactive device 20, the environment perceiving device 30, the defect detection device 40, the processing device 50, and the memory 60 (not shown in FIG. 2 and FIG. 3) are all installed on the movable platform 1 and housed in the outer cover 70, partially exposed from the outer cover 70. The outer cover 70 can be provided with multiple anti-collision strips. In the example shown in the figures, the outer cover 70 is provided with two anti-collision strips 71 and 72 that are spaced apart from each other, so that even if a collision with the detection object occurs, the impact on the various devices in the outer cover 70 can be reduced, and damage to the collided detection object caused by the outer cover 70 can also be prevented. In addition, impact sensors 34 may be embedded in the anti-collision strips 71 and 72 of the outer cover 70.

In the example shown in the figures, the bottom of the movable platform 10 is provided with multiple traveling wheels including two driving wheels 11 and 12 and four follower wheels 13-16, as shown in FIG. 4. The driving wheels 11 and 12 are connected to an output shaft of the drive motor (not shown in the figures), to drive the movable platform 10 to move under drive of the drive motor. The driving wheel 11 and the driving wheel 12 are connected to the movable platform 10 via a support rod (not shown in the figures) having a shock absorber (such as a damping spring) to reduce vibration. There is a steering link (not shown in the figures) installed between the driving wheels 11 and 12, which can steer the traveling direction of the driving wheels 11 and 12. In addition, a differential device 17 is installed on a connecting shaft between the driving wheels 11 and 12, so that the driving wheels 11 and 12 can move at different speeds to facilitate steering.

The follower wheels 13-16 can correspondingly change the direction of motion according to the direction of motion of the driving wheels 11 and 12. The follower wheels 13-16 are installed to surround the center of the bottom of the movable platform 10 and be spaced apart from each other. In the example shown in the figures, all of the follower wheels 13-16 are universal wheels, and are arranged at four corners around the center of the bottom of the movable platform 10. The follower wheels 13-16 can be controlled to independently rise and fall, so that a portion of the follower wheels 13-16 can participate in the motion of the movable platform 10 as needed, thereby providing better trafficability. Preferably, the rise and fall of two follower wheels located diagonally in the follower wheels 13-16 are simultaneously controlled, so as to stably support the movable platform 10. By arranging the driving wheels 11 and 12 and the follower wheels 13-16 in this way, greater flexibility and stability can be provided for the motion of the movable platform 10.

The movable platform 10 is further provided with a handle 18. When the outer cover 70 is installed, the handle 18 is exposed from a corresponding opening in an upper part of the outer cover. The operator can move the automatic detection system 1 by grasping the handle 18. In the example shown in the figures, the interactive device 20 is installed on the movable platform 10 and exposed through a corresponding opening of the outer cover 70 for operation by the operator. The interactive device 20 is an electronic display screen, such as a touch electronic display screen. The interactive device 20 may also adopt other suitable forms.

In the example shown in the figures, the environment perceiving device 30 is installed on the movable platform 10, where the motion camera 31 is a high-speed binocular camera. When installed in place, the impact sensors 34 are embedded in the anti-collision strips 71 and 72 of the outer cover 70, and the wheel odometer 33 is installed on the driving wheel 11.

The automatic detection system 1 has two detection modes, namely learning detection mode and automatic detection mode.

Taking the cargo hold of an aircraft as an example of the detection object, the following introduces the automatic detection method using the automatic detection system 1 according to the present disclosure.

Figure 5:
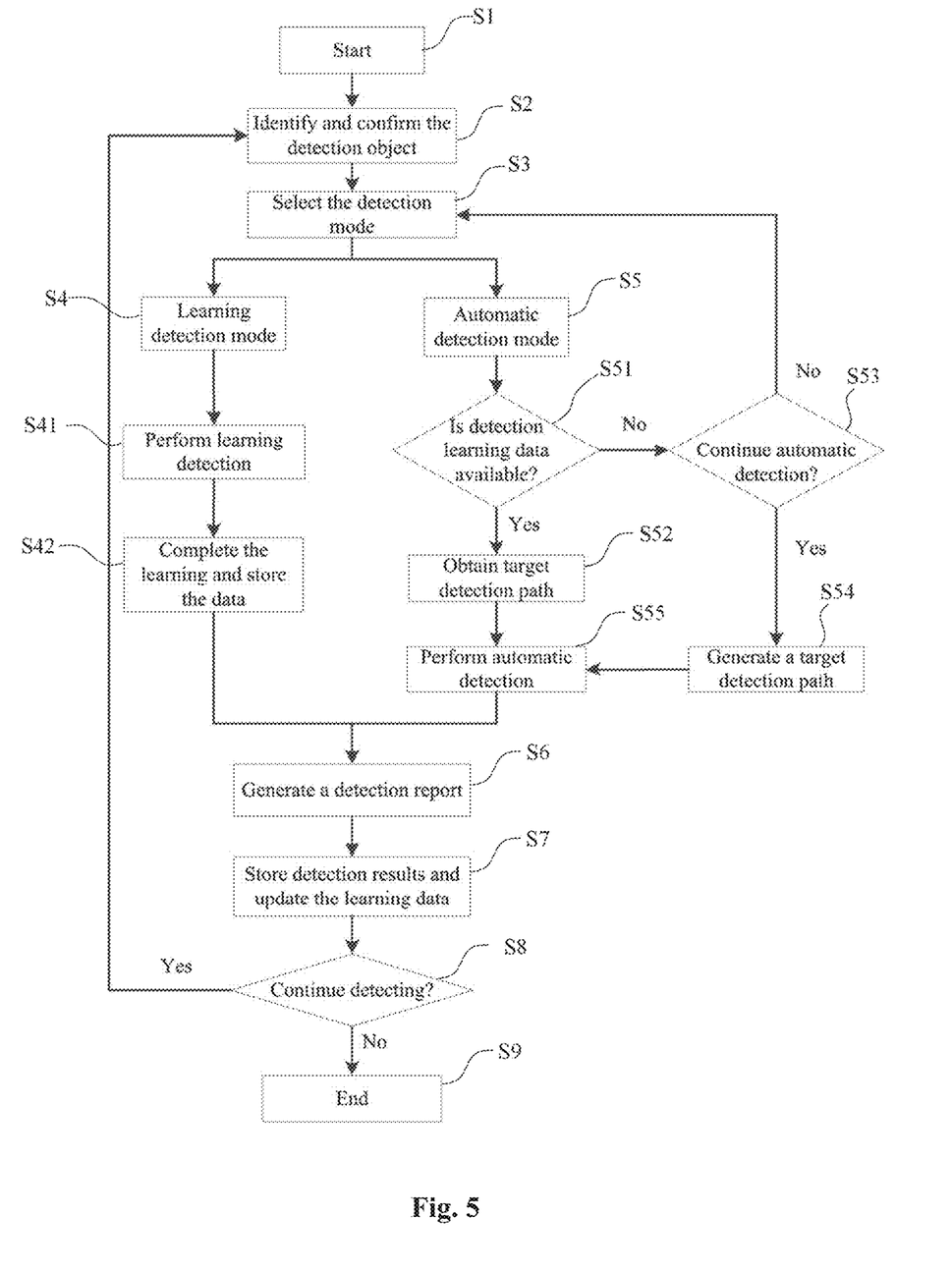
FIG. 5 shows a flowchart of an automatic detection method according to an embodiment of the present disclosure.

FIG. 5 shows a flowchart of the automatic detection method according to the present disclosure. As shown in FIG. 5, in step S1, the automatic detection system 1 is moved to the vicinity of a cargo door of the aircraft, and the automatic detection system 1 is activated. The operator can activate the automatic detection system 1 by using a power switch (not shown) on the automatic detection system 1. Then, in step S2, the operator starts the automatic detection system 1 by operating on the interface of the interactive device 20 to identify and confirm the detection object. During this process, the motion camera 31 of the environment perceiving device 30 is aimed at a quick response code on the cargo door of the aircraft for photographing. The data obtaining and preprocessing part 51 of the processing device 50 obtains the quick response code image captured by the motion camera 31, identifies the information in the quick response code image, compares it with the data stored in the memory 60 to identify the information of the cargo hold to be detected, such as the model and numbering of the cargo hold, and displays the identified information of the cargo hold on the interface of the interactive device 20 for confirmation by the operator.

After the operator confirms the information of the cargo hold to be detected, in step S3, the operator selects the detection mode on the interface of the interactive device 20. The operator can choose the learning detection mode or the automatic detection mode. If the operator selects the learning detection mode, the method proceeds to step S4 to activate the learning detection mode. In the learning detection mode, the operator operates by himself the automatic detection system 1 to complete the detection of the cargo hold. Specifically, in step S41, the operator enters the cargo hold to be detected together with the automatic detection system 1. The operator controls by himself the motion of the automatic detection system 1 (such as a travel speed, a travel path, and dwell time at a certain point of the movable platform 10) and operates the defect detection device 40 to conduct the detection so as to perform the learning detection. During the process of performing detection in the learning detection mode, the operator can input the detection mark point data via the interactive device 20. Specifically, the operator can record specific detection locations as detection mark points and input detection results via the interactive device 20. The specific detection location can be a location that is determined as being prone to defects (such as dents or cracks) based on the experience of the operator, or it can be a location where defects have been previously detected. The processing device 50 processes the localization data and other environmental measurement data obtained from the environment perceiving device 30 to identify a motion path of the movable platform 10 during this process and identify the detection mark points recorded by the operator and data associated with the mark points (such as the dwell time or motion speed of the movable platform 10, and the photographing pose of the detection photographing device 41), and stores them in the memory 60 as learning data of the automatic detection mode, where the identified motion path of the movable platform 10 can be used as a target detection path of the automatic detection mode. In step S42, the learning is completed and the operation data during this process is stored into the memory 60 as learning data of the automatic detection mode.

If the operator selects the automatic detection mode, the method proceeds to step S5 and prepares to start automatic detection. Specifically, in step S51, the processing device 50 searches in the memory 60 to confirm whether the learning data of the cargo hold is available. If there is learning data of the cargo hold in the memory 60, in step S52, the target detection path for this detection is obtained, and the automatic detection mode is entered in step S55 to execute automatic detection. If there is no learning data of the cargo hold in the memory 60, in step S53, a message is displayed on the interactive device 20, indicating that there is currently no learning data of the cargo hold in the automatic detection system 1 and the operator is invited to confirm whether to continue automatic detection. If the operator chooses not to perform automatic detection, a mode selection interface pops up on the interactive device 20, allowing the operator to reselect the learning detection mode or exit directly. If in step S53, the operator confirms to continue automatic detection, then in step S54, the control part 52 of the processing device 50 automatically generates a target detection path based on the DMU data and detection rules of the cargo hold obtained by the data obtaining and preprocessing part 51. Then, the method proceeds to step S55 to perform automatic detection.

After the detection in either the learning detection mode or the automatic detection mode is completed, the automatic detection system 1 returns to the starting point. In step S6, the detection analyzing part 53 of the processing device 50 analyzes the detection position metadata stored in the memory 60 based on the DMU data of the cargo hold, judges the detection results according to the detection specification of the cargo hold, and generates a detection report. After the detection is performed in the learning detection mode, if the operator has already inputted the detection results via the interactive device 20 during the detection process, the detection analyzing part 53 can generate the detection report based on the operator's input via the interactive device 20 and the DMU data of the cargo hold. The contents of the detection report include whether there are defects, the types of detected defects, the locations of the detected defects, and the three-dimensional dimensional information of the detected defects. In step S7, the area where defects (such as dents or cracks) are detected is marked as a new detection mark point, and data associated with the new detection mark point (such as the dwell time or motion speed of the movable platform 10, and the photographing pose of the detection photographing device 41) is stored into the memory 60 to update the learning data of the cargo hold based on the detection result of the cargo hold for the next automatic detection.

In step S8, it is determined whether to continue detecting. If it is determined to continue detecting, steps S2 to S7 are repeated. If it is determined not to continue detecting, the detection operation is ended in step S9.

It should be noted that steps S6 and S7 can also be executed after the detection operation is ended. For example, steps S6 and S7 can be executed after the automatic detection system 1 returns to a detection center, which can reduce the real-time computing load of the processing device 50.

Figure 6:
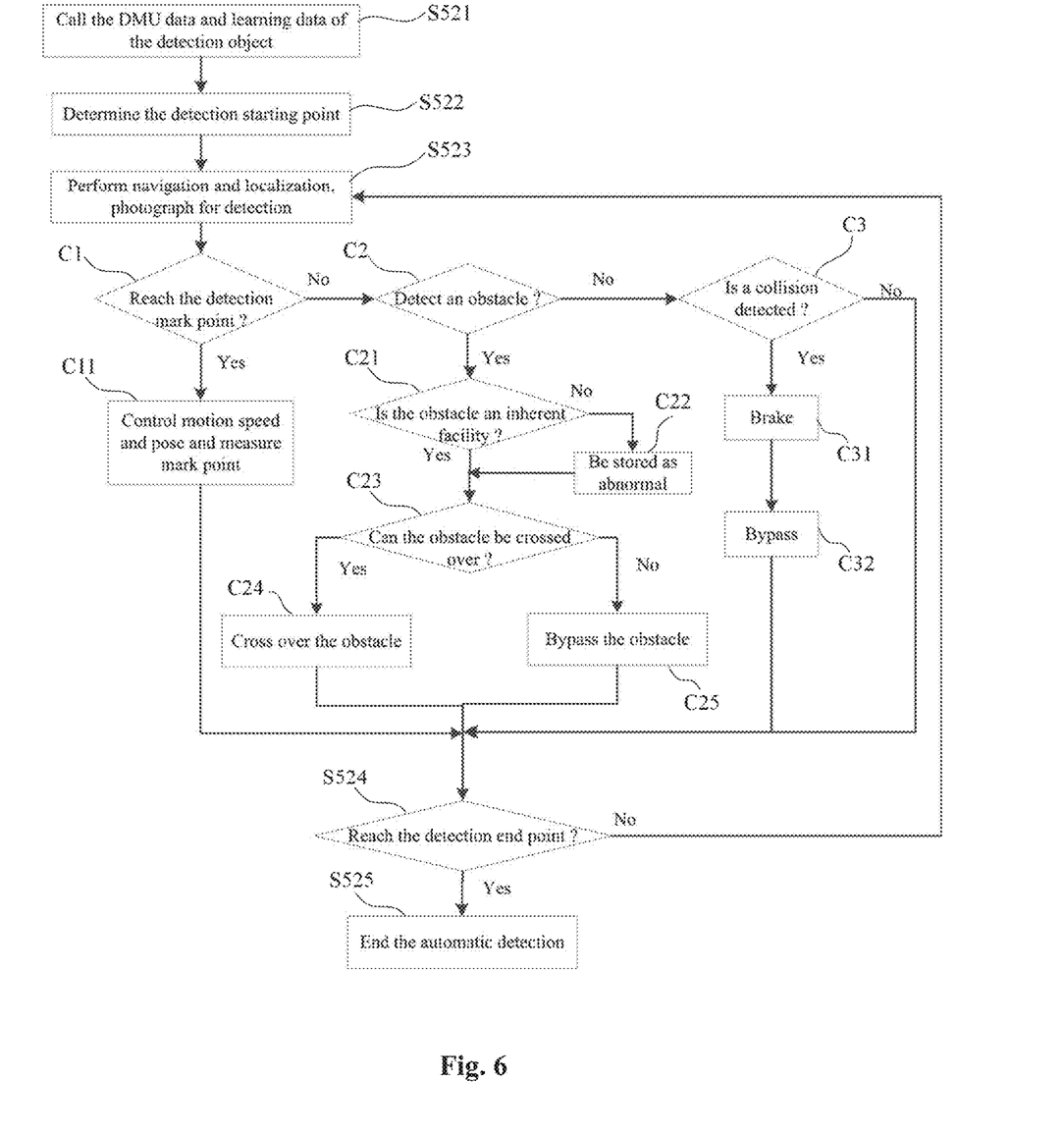
FIG. 6 shows a detection flowchart of an automatic detection mode of the automatic detection method according to the present disclosure.

FIG. 6 shows a detection flowchart of the automatic detection of step S55 in FIG. 5. After the automatic detection is started, in step S521, the detection object obtaining module 511 of the data obtaining and preprocessing part 51 of the processing device 50 calls the DMU data and available learning data of the cargo hold from the memory 60. By utilizing the DMU data, the entrance and contour of the cargo hold, and the facilities inside the cargo hold (such as ground locks, vents and so on) can be identified during the motion process, so that corresponding avoidance measures can be taken during the motion process, and the minimum safe distance can be determined based on the identified contour of the cargo hold during the motion process.

In step S522, the data obtaining and preprocessing part 51 obtains the localization images captured by the motion camera 31 and preprocesses them, and determines the current position of the automatic detection system 1 relative to the cargo hold in combination with the DMU data of the cargo hold, thereby determining the detection starting point. In step S523, based on the determined detection starting point and the target detection path of the current automatic detection, combined with the DMU data of the cargo hold, the automatic detection system 1 is navigated and positioned, and the motion speed of the movable platform 10, and the poses of the movable platform 10 and the devices carried thereon, etc., are controlled, so that the automatic detection system 1 moves along the target detection path and performs detection. During the navigation and localization process, the localization data preprocessing module 512 of the processing device 50 performs texture optimization on the localization images captured by the motion camera 31 to improve the quality of the localization images and thereby improve the robustness of navigation and localization.

During the navigated motion along the target detection path, as shown in step C1, it is determined whether the detection mark point is reached. If the detection mark point is reached, in step C11, based on the learning data corresponding to the detection mark point stored in the memory 60, the poses of the movable platform 10 and the motion camera 31 and the detection photographing device 41 carried thereon are controlled, and the three-dimensional measurement device 42 measures the detection mark point.

During the navigated motion, obstacles can also be automatically identified. As shown in step C2, the obstacle detection module 523 of the control part 52 determines whether an obstacle is detected. After confirming that an obstacle is detected, in step C21, based on the measurement data of the ultrasonic sensor 36, the lidar 37, and the TOF sensor 38, the obstacle detection module 523 of the control part 52 determines the three-dimensional dimensions and position of the obstacle, and compares those data with the DMU data of the cargo hold to determine whether the obstacle is an inherent facility (such as a ground lock) in the cargo hold. If it is determined that the obstacle is not an inherent facility in the cargo hold, the obstacle is identified as abnormal in step C22 and its information is stored into the memory 60.

Next, based on the information of the identified obstacle, it is determined in step C23 whether the obstacle can be directly crossed over. If it is determined that the obstacle can be crossed over, in step C24, the control part 52 controls the movable platform 10 to continue moving along the predetermined target detection path without changing its direction of motion and cross over the obstacle. During this process, a pair of follower wheels located diagonally in the follower wheels 13-16 can be raised to improve the trafficability of the movable platform 10 meanwhile ensuring the stability of the movable platform 10. For example, the follower wheels 13 and 15 shown in FIG. 4 are raised, so that the movable platform 10 moves by means of the driving wheels 11 and 13 as well as another pair of follower wheels 14 and 16. If it is determined that the obstacle cannot be crossed over, in step C25, the movable platform 10 is controlled to bypass the obstacle to avoid collision. For example, in a case that the height of the obstacle exceeds 5 cm and the slope exceeds 10 degrees, it is considered that the obstacle cannot be directly crossed over and therefore needs to be bypassed. During the bypassing process, a suitable bypassing scheme can be selected considering the positions of the movable platform 10 and the obstacle relative to the cargo hold. For example, the driving wheels 11 and 12 of the movable platform 10 turn as shown by arrow K1 in FIG. 4 or retreat as shown by arrow K3 in FIG. 4, and the follower wheels 13-16 correspondingly turn as shown by arrow K2 or arrow K4. During this process, a pair of follower wheels located diagonally in the follower wheels 13-16 can also be raised. For example, when the driving wheels 11 and 12 turn as shown by arrow K1 in FIG. 4, the follower wheels 13 and 15 can be raised.

During the navigated motion, collisions can also be detected and quickly alleviated. In step C3, once the impact sensor 34 of the environment perceiving device 30 detects a collision, the control part 52 controls the movable platform 10 to urgently brake the driving wheels 11 and 12 and then to bypass, thereby quickly alleviating the occurring collision. In addition, in the automatic detection system 1, anti-collision strips 71 and 72 (as best seen in FIG. 2) are installed on the outer cover 70. Even in the event of a collision, on the one hand, the adverse impact of the collision on the devices carried on the movable platform 10 can be reduced, and on the other hand, the detected cargo hold will not be damaged.

In step S524, it is determined whether the detection end point is reached. If the detection end point is not reached, the navigated motion continues and is accompanied by detection photographing. If the detection end point is reached, the automatic detection ends in step S525.

In the navigated motion, the data obtaining and preprocessing part 51 of the processing device 50 fuses the data of the multiple sensors, and uses a localization scheme of simultaneous localization and mapping (SLAM) to determine the poses of the movable platform 10 and the devices carried thereon in real-time, and the control part 52 controls the movable platform 10 and the devices carried thereon accordingly.

Figure 7:
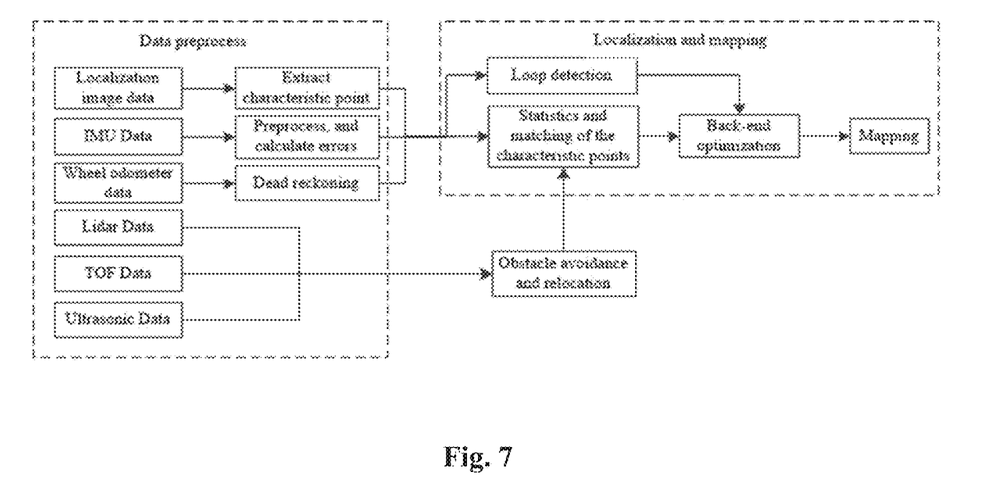
FIG. 7 shows a schematic diagram of a navigation operation according to an example of the present disclosure.

FIG. 7 shows a schematic block diagram of a SLAM based localization scheme fusing data of multiple sensors according to an example of the present disclosure. In the example shown in the figure, the front-end processing of the SLAM based localization scheme adopts the method of characteristic point. As shown in FIG. 7, firstly, the data of each sensor is preprocessed. Texture optimization is automatically performed on the localization images captured by the motion camera 31 (binocular camera), and characteristic points are extracted from the optimized localization image data. The IMU data measured by IMU32 is preprocessed, and errors are calculated. Dead reckoning is performed on the data of wheel odometer 33. The localization image data of the motion camera 31 is fused with the IMU data, and the IMU data is fused with the data of the wheel odometer 33. Then, localization and mapping are performed on the basis of the above fusion. Specifically, on the basis of fusion of data of the multiple sensors, statistics and matching of the characteristic points are performed, and loop detection is performed. Then, the real-time pose of the platform 10 is obtained after back-end optimization. In addition, in the process of localization and mapping, the information of the obstacle identified based on the lidar data, the TOF sensor data and the ultrasound data is used for relocation to achieve obstacle avoidance. In the above localization scheme, by fusing data of the multiple sensors and performing loop detection, cumulative errors can be eliminated, shift of pose can be minimized, and accurate navigation and localization can be achieved. The pose of the device carried on the movable platform 10 can be calculated based on the relative position between the device and the movable platform 10. During the detection, the calculated real-time pose of the detection photographing device 41 is associated with the detection image captured by the detection photographing device 41 to form detection position metadata. The detection position metadata is stored into the memory 60.

Figure 8:
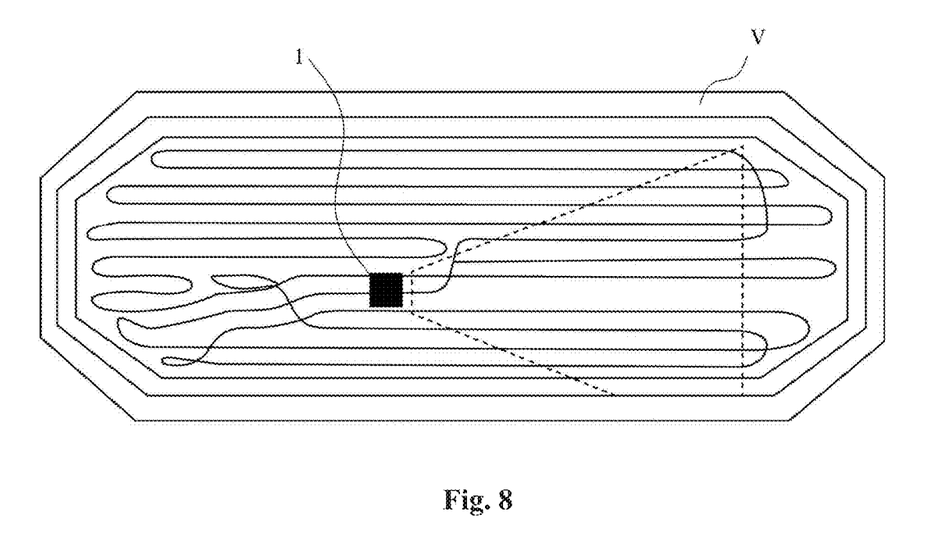
FIG. 8 shows a schematic diagram of a path of the automatic detection system during detection.

FIG. 8 is a schematic diagram showing a detection by the automatic detection system 1 in a cargo hold V, where the dashed line in FIG. 8 shows the field of view for detection of the automatic detection system 1.

The automatic detection system 1 and the automatic detection method according to the present disclosure can flexibly select the detection mode according to needs, and can learn on the basis of the manually operated learning detection mode, where the empirical operation data of the operator is combined into the automatic detection mode, so that the automatic detection can be effectively executed, ensuring the accuracy of the detection results. Once entering the automatic detection mode, the automatic detection system 1 and the automatic detection method can automatically perform the detection without the need for further remote operation and control by the operator. During the detection, the automatic detection system 1 and the automatic detection method according to the present disclosure can accurately perform real-time localization and navigation based on the measurement data of the multiple sensors and the DMU data of the detection object, improving the accuracy of localization and navigation and further improving the accuracy of the detection results. Moreover, the automatic detection system 1 and the automatic detection method can detect obstacles in the motion path, and can avoid the obstacles, and reduce or avoid collisions. In addition, the anti-collision strips 71 and 72 are installed on the outer cover 70 of the automatic detection system 1. Even if a collision occurs, the impact generated by the collision can be reduced, the adverse impact on the devices of the automatic detection system 1 can be reduced, and damage to the detection object caused by collision with the automatic detection system 1 can also be avoided.

The automatic detection system 1 and the automatic detection method according to the present disclosure are described hereinbefore with reference to the accompanying drawings, and the applications of the automatic detection system and the automatic detection method according to the present disclosure are also described by taking the cargo hold of an aircraft as the detection object. However, the above examples should not be used as limitations to the automatic detection system and the automatic detection method according to the present disclosure. The automatic detection system and the automatic detection method according to the present disclosure can also be applied to the detection of other application scenarios (such as ship cargo holds).

The exemplary embodiments of the present disclosure have been described in detail, but it should be understood that the present disclosure is not limited to the specific embodiments described and shown in detail above. Without departing from the spirit and scope of the present disclosure, those skilled in the art can make various modifications and variations to the present disclosure. All these variations and modifications fall within the scope of the present disclosure. Moreover, all the members described herein can be replaced by other technically equivalent members.

The invention claimed is:

1. An automatic detection system for an enclosed space, comprising:

an interactive device, configured to provide interaction between an operator and the automatic detection system;

a movable platform, configured to move within the enclosed space;

an environment perceiving device, configured to obtain environmental data of the movable platform during motion of the movable platform;

a defect detection device, configured to detect the enclosed space to generate detection data, wherein the defect detection device comprises a detection photographing device;

a memory, which stores digital mock-up data of the enclosed space; and a processing device, which communicates with the movable platform, the interactive device, the environment perceiving device, the defect detection device and the memory, and is configured to process the environmental data of the environment perceiving device to control the movable platform and the defect detection device, and process the detection data generated by the defect detection device to generate a detection report, wherein the interactive device, the environment perceiving device, the defect detection device, the memory and the processing device are installed on the movable platform, and the interactive device is operatable to identify the enclosed space and enable the automatic detection system to automatically perform detection in an automatic detection mode based on the digital mock-up data of the enclosed space.

2. The automatic detection system for the enclosed space according to claim 1, wherein the processing device comprises:

a data obtaining and preprocessing part, configured to obtain the digital mock-up data of the enclosed space from the memory, obtain the environmental data from the environment perceiving device and the detection data from the defect detection device, and preprocess the environmental data and the detection data;

a control part, configured to communicate with the data obtaining and preprocessing part to determine a target detection path; and a detection analyzing part, configured to communicate with the data obtaining and preprocessing part to analyze a detection result and generate a detection report, wherein the processing device is such configured that: in the automatic detection mode, the data obtaining and preprocessing part searches for available learning data in the memory, wherein the learning data comprises the target detection path of the movable platform and detection mark point data;

if the data obtaining and preprocessing part finds available learning data, the control part obtains the target detection path from the learning data; if the data obtaining and preprocessing part finds no available learning data, the control part automatically generates a target detection path based on the digital mock-up data of the enclosed space obtained by the data obtaining and preprocessing part; and the control part controls the movable platform to move along the target detection path.

3. The automatic detection system for the enclosed space according to claim 2, wherein the interactive device is operatable to enable the automatic detection system to perform detection in a learning detection mode, and in the learning detection mode, the operator operates the movable platform and the defect detection device, and inputs the detection mark point data via the interactive device; and the processing device is such configured that: in the learning detection mode, the control part communicates with the data obtaining and preprocessing part to automatically identify a motion path of the movable platform and detection mark point data, stores the identified motion path of the movable platform and the identified detection mark point data into the memory as learning data of the automatic detection mode.

4. The automatic detection system for the enclosed space according to claim 2, wherein the detection analyzing part is configured to: update the learning data of the automatic detection mode for the enclosed space based on a detection result of the enclosed space.

5. The automatic detection system for the enclosed space according to claim 2, wherein the environment perceiving device comprises:

a motion camera, configured to capture localization images while moving with the movable platform; and an inertial measurement unit and a wheel odometer, wherein the inertial measurement unit and the wheel odometer are configured to measure the motion of the movable platform, wherein the processing device is such configured that: the data obtaining and preprocessing part preprocesses the localization images captured by the motion camera and the measurement data of the inertial measurement unit and the wheel odometer for determining a pose of the movable platform by the control part.

6. The automatic detection system for the enclosed space according to claim 5, wherein the data obtaining and preprocessing part is configured to perform texture optimization for the localization images.

7. The automatic detection system for the enclosed space according to claim 5, wherein the environment perceiving device further comprises a light intensity sensor, and the automatic detection system further comprises an illumination device, wherein the illumination device is installed on the motion camera or the defect detection device; and the processing device is configured to selectively activate the illumination device based on a detection result of the light intensity sensor.

8. The automatic detection system for the enclosed space according to claim 5, wherein the environment perceiving device further comprises:

an impact sensor, configured to detect collision of the automatic detection system; and an obstacle detection sensor, configured to detect obstacles in the motion path of the movable platform, wherein the obstacle detection sensor comprises at least one of ultrasonic sensor, lidar and time of flight sensor; and the processing device is such configured that: the data obtaining and preprocessing part obtains and preprocesses measurement data from the impact sensor and the obstacle detection sensor, for controlling the motion of the movable platform by the control part.

9. The automatic detection system for the enclosed space according to claim 1, wherein the automatic detection system further comprises an outer cover, wherein the outer cover is installed to the movable platform to accommodate the devices carried by the movable platform at least partly inside the outer cover, and the outer cover is provided with an anti-collision strip.

10. The automatic detection system for the enclosed space according to claim 1, wherein the movable platform is provided with two driving wheels and a plurality of follower wheels, wherein the plurality of follower wheels are configured to be independently controlled.

11. The automatic detection system for the enclosed space according to claim 1, wherein the enclosed space is a cargo hold or passenger compartment of an aircraft.

12. An automatic detection method for an enclosed space, wherein the automatic detection method is executed by an automatic detection system, wherein the automatic detection system comprises an interactive device, a movable platform, an environment perceiving device, a defect detection device, a memory and a processing device, wherein the interactive device, the environment perceiving device, the defect detection device, the memory and the processing device are installed on the movable platform, and the processing device communicates with the interactive device, the movable platform, the environment perceiving device, the defect detection device and the memory, wherein the automatic detection method comprises the following steps:

operating the interactive device to identify and confirm the enclosed space;

operating the interactive device to enable the automatic detection system to automatically perform detection in an automatic detection mode based on digital mock-up data of the enclosed space; and automatically generating a detection report.

13. The automatic detection method for the enclosed space according to claim 12, wherein when detection is performed in the automatic detection mode, the automatic detection method comprises:

searching for the digital mock-up data of the enclosed space in the memory;

searching for available learning data in the memory, wherein the learning data comprises a target detection path of the movable platform and detection mark point data;

if available learning data is found, obtaining the target detection path from the learning data, and if no available learning data is found, automatically generating the target detection path on the basis of the digital mock-up data of the enclosed space; and controlling the movable platform to move along the target detection path, and controlling the defect detection device to detect the enclosed space to generate detection data.

14. The automatic detection method for the enclosed space according to claim 13, wherein the automatic detection method further comprises: operating the interactive device to enable the automatic detection system to perform detection in a learning detection mode; and when detection is performed in the learning detection mode, the automatic detection method comprises:

operating, by an operator, the automatic detection system to control the motion of the movable platform and control the defect detection device to generate detection data, and inputting detection mark point data via the interactive device;

obtaining, by the processing device, environmental data from the environment perceiving device, automatically identifying the motion path of the movable platform and the detection mark point data, and storing the identified motion path of the movable platform and the identified detection mark point data into the memory as learning data of the automatic detection mode.

15. The automatic detection method for the enclosed space according to claim 13, wherein the environment perceiving device comprises a motion camera, an inertial measurement unit and a wheel odometer;

the automatic detection method comprises: processing localization images captured by the motion camera and measurement data of the inertial measurement unit and the wheel odometer to calculate a real-time pose of the movable platform.

16. The automatic detection method for the enclosed space according to claim 15, wherein the environment perceiving device further comprises an obstacle detection sensor and an impact sensor, wherein the obstacle detection sensor comprises at least one of ultrasonic sensor, lidar and time of flight sensor; and when detection is performed in the automatic detection mode, the automatic detection method further comprises: controlling the motion of the movable platform based on measurement results of the obstacle detection sensor and the impact sensor.

17. The automatic detection method for the enclosed space according to claim 15, wherein the environment perceiving device further comprises a light intensity sensor, and the automatic detection system further comprises an illumination device, wherein the illumination device is installed on the motion camera or the defect detection device;

when detection is performed in the automatic detection mode, the automatic detection method further comprises: automatically activating the illumination device when insufficient light is detected by the light intensity sensor.

18. The automatic detection method for the enclosed space according to claim 13, wherein the defect detection device comprises a detection photographing device, and when detection is performed in the automatic detection mode, the automatic detection method comprises:

controlling a speed of the movable platform and a pose of the detection photographing device on the basis of the learning data when reaching the detection mark point.

19. The automatic detection method for the enclosed space according to claim 13, wherein the automatic detection method further comprises: updating the learning data of the automatic detection mode for the enclosed space based on a detection result of the enclosed space.

20. The automatic detection method for the enclosed space according to claim 12, wherein the movable platform is provided with two driving wheels and a plurality of follower wheels; and when detection is performed in the automatic detection mode, the automatic detection method further comprises raising some of the plurality of follower wheels.

* * * * *